United States Patent [19]

Leclerc et al.

[11] Patent Number: 5,264,091
[45] Date of Patent: Nov. 23, 1993

[54] METHOD AND AN ELECTROCHEMICAL INSTALLATION FOR TREATING AQUEOUS EFFLUENT CONTAINING A HEAVY METAL

[75] Inventors: Olivier Leclerc, Rouen; Claude Lahitte, Nanterre; Norinda Chhim, Paris, all of France

[73] Assignee: Electricite De France, Paris, France

[21] Appl. No.: 950,826

[22] Filed: Sep. 24, 1992

[30] Foreign Application Priority Data

Sep. 27, 1991 [EP] European Pat. Off. ........ 91402586.1

[51] Int. Cl.$^5$ .............................. C25C 7/00; C25C 1/00
[52] U.S. Cl. ..................................... 204/149; 204/284
[58] Field of Search ............................. 204/149, 284

[56] References Cited

U.S. PATENT DOCUMENTS

| | | | |
|---|---|---|---|
| 3,899,405 | 8/1975 | Iverson et al. | 204/149 |
| 3,919,062 | 11/1975 | Lundquist, Jr. et al. | 204/149 |
| 4,226,685 | 10/1980 | Portal et al. | 204/149 |

OTHER PUBLICATIONS

Copy of Patent Abstract JP-A-58,067,881 Jul. 1983.

*Primary Examiner*—John Niebling
*Assistant Examiner*—Patrick J. Igoe

[57] ABSTRACT

An electrochemical installation for treating aqueous effluent containing a heavy metal, the installation comprising an electroplating reactor for the heavy metal, itself comprising a tank in which alternating electrodes of opposite polarity are placed, the cathodes being removable volume electrodes each constituted by a cassette in the form of two facing frames each supporting a wall that is permeable to said aqueous effluent, the permeable walls of a single cathode defining a space that is filled with an active granular material and in which a metal current-feed grid is disposed. According to the invention, the installation further comprises a regeneration electrochemical reactor for receiving the cathodes as anodes, the metal constituting the metal current-feed grids being selected from metals having an oxidation-reduction potential greater than that of the heavy metal to be electroplated and enabling the end of regeneration to be detected. The invention is applicable to depolluting aqueous effluent polluted by waste containing heavy metals.

7 Claims, 7 Drawing Sheets

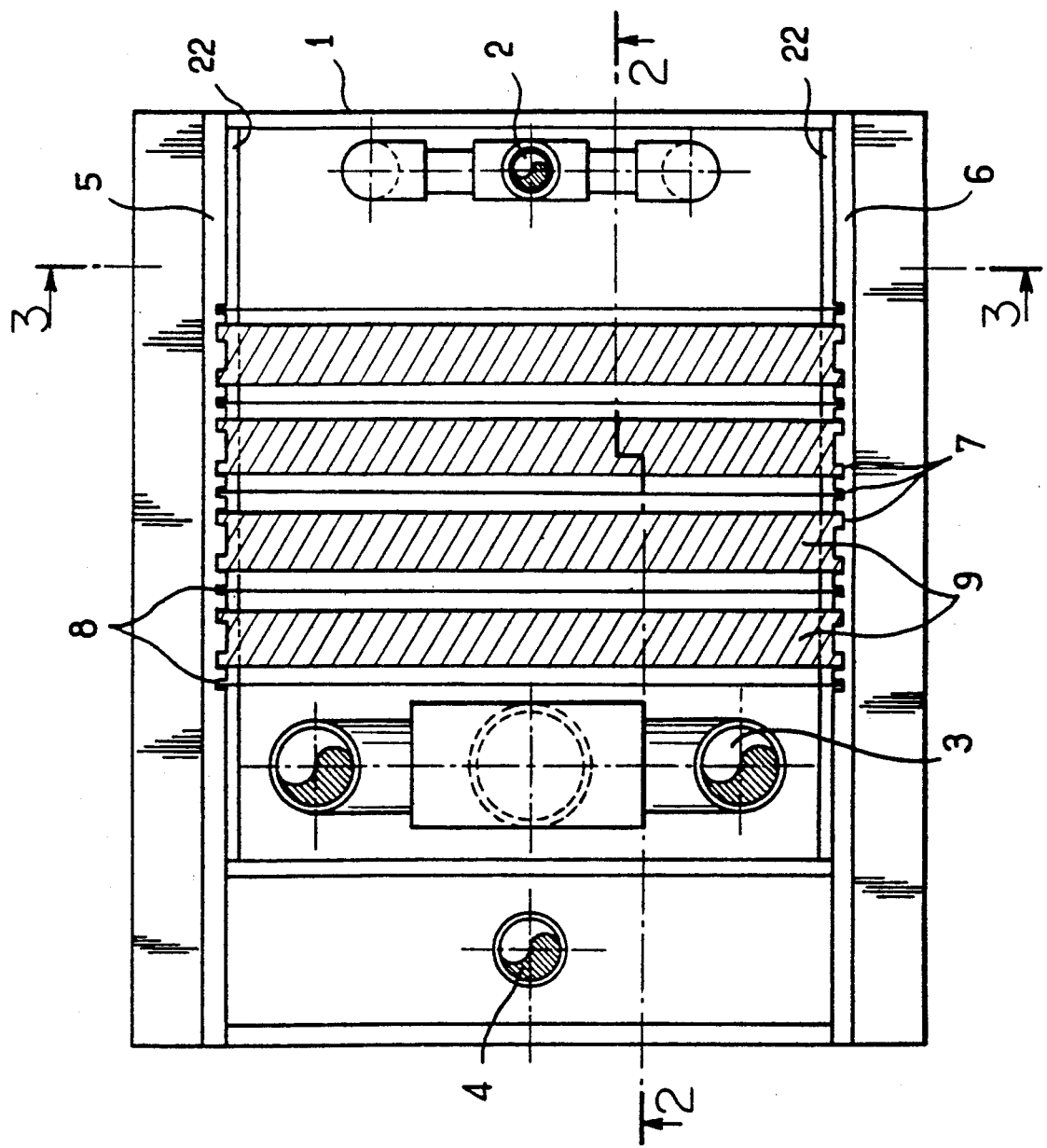

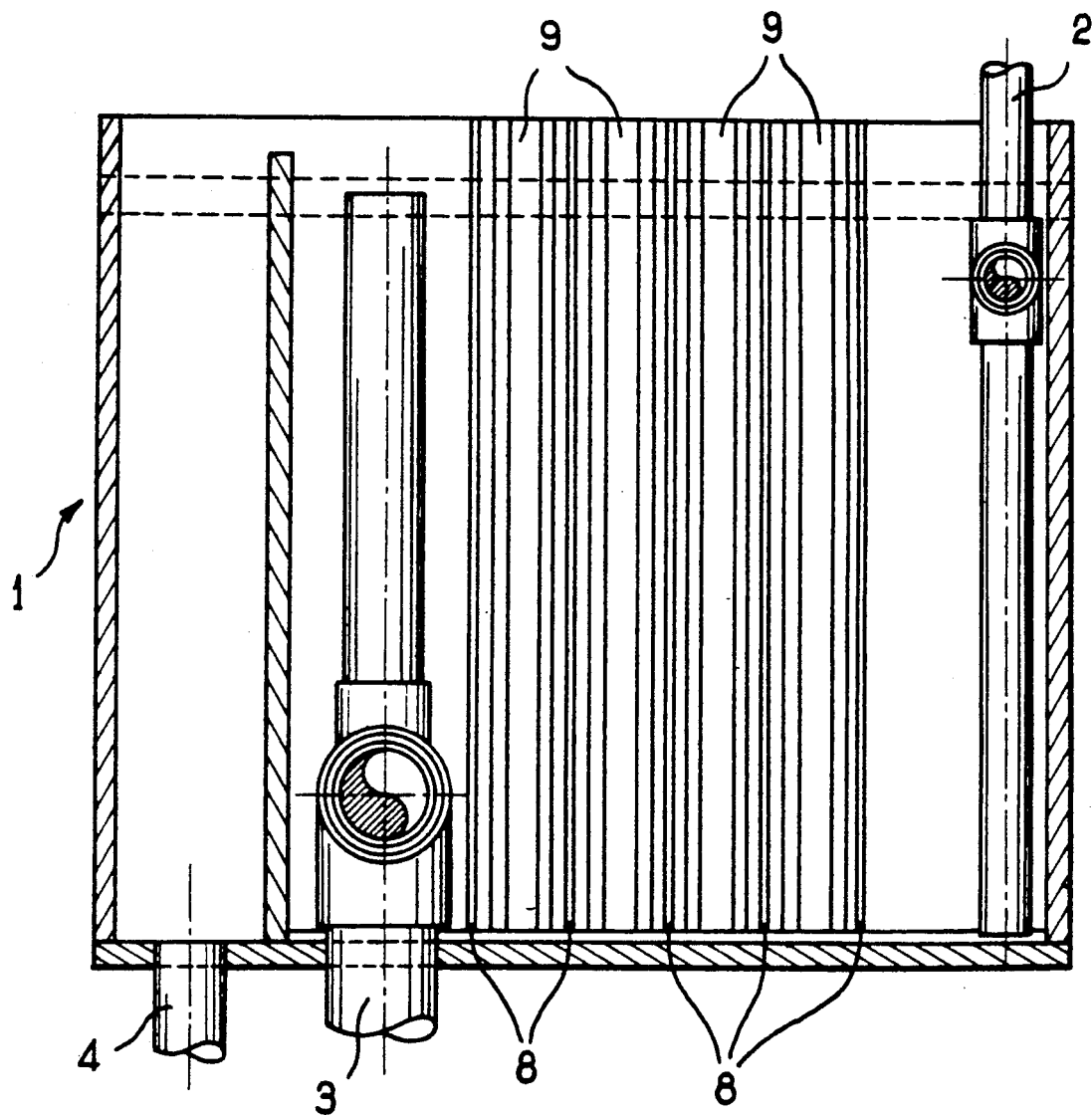
FIG_2

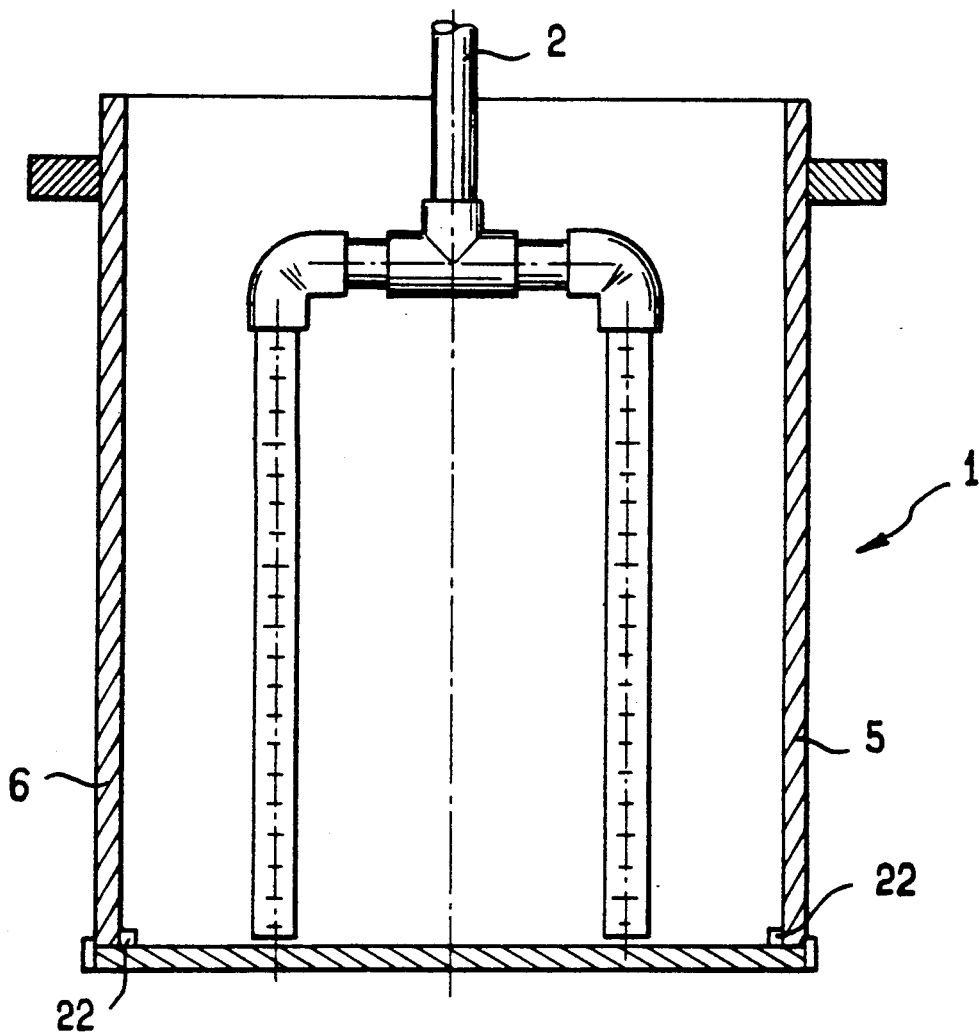
FIG._3
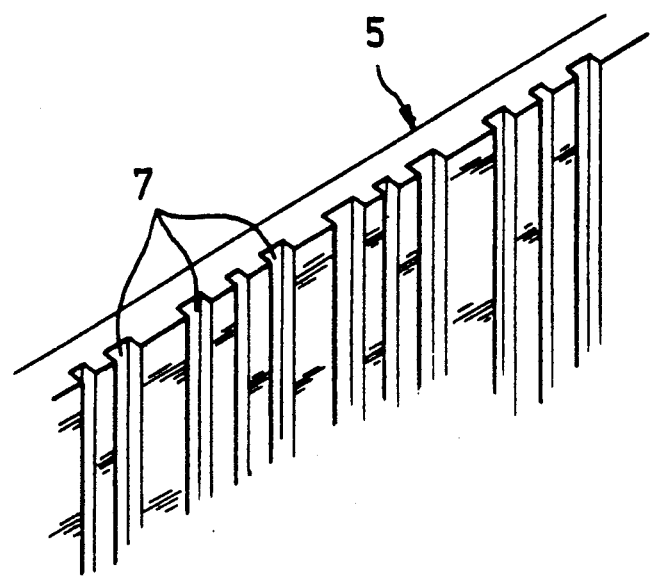
FIG._4

METHOD AND AN ELECTROCHEMICAL INSTALLATION FOR TREATING AQUEOUS EFFLUENT CONTAINING A HEAVY METAL

The present invention relates to an electrochemical installation for treating aqueous effluent containing a heavy metal, and also to a method implementing said installation.

BACKGROUND OF THE INVENTION

The pollution of aqueous effluent by waste containing heavy metals represents a significant fraction of the harm due to industry. It is estimated that 30% of industrial pollution is due to the surface treatment sector on its own. As a result, environmental constraints on this sector of activity are becoming more and more severe.

Numerous depollution techniques have been developed: precipitation-filtration; treatment by means of ion-exchanging resins; cementation; reverse osmosis; and electroplating. Particular use has been made of electroplating.

Only a few years ago, the majority of electrochemical reactors made use of electrodes in the form of solid plates suitable for working in media that are highly concentrated in the metal to be electroplated. However, such electrodes are not suitable for obtaining a concentration at the end of treatment compatible with waste standards now in force. Such electrodes are generally used either for preparing various metals by electrosynthesis, or else in the treatment of industrial effluent for the purpose of changing the concentration of an effluent from a high value (typically of the order of several tens of grams/liter (g/l)) to a value making it possible to use new cathodes that are adapted to operating in a dilute solution of electroactive metal.

Progress in electrochemical engineering has contributed to developing systems that use "volume" cathodes which are particularly suitable for recovering compounds that are present at low concentration in the electrolyte. The advantage of such a cathode is to be able to provide a large electrode area per unit volume, and also to provide high speeds of material transfer.

U.S. Pat. No. 4,226,685, in particular, describes a reactor for treating aqueous effluent containing a heavy metal by electroplating, said reactor comprising a tank in which alternating electrodes of opposite polarity are placed, with the cathodes being removable volume electrodes constituted by respective cassettes each comprising two facing frames and each supporting a wall that is permeable to said aqueous effluent, the permeable walls of any one cathode defining a volume that is filled with an active granular material and within which a metal current-feed grid is disposed.

Volume cathodes may be of multiple shapes and may implement multiple technologies. For example there exist cathodes that are porous, fluidized, pumped, etc., each having specific advantages that generally amount to optimum operation in a dedicated range of concentrations.

The main difficulty encountered with such electrodes is that once they are saturated with metal, it is necessary to change the volume electrodes, and in most cases such a change means that the electrolyzer is disassembled, thereby reducing the effectiveness of the method because the electroplating operation is interrupted. Depending on the technology used, this reconditioning of the electrochemical reactor can be quite lengthly. Furthermore, the cathode or the recovered active granular material must be retreated so as to recycle the metal that has been extracted from the industrial effluent. In most cases, treatment takes place in a location external to the site on which the effluent is treated by electroplating.

Thus, the technical problem to be solved by the present invention is to implement an electrochemical installation for treating aqueous effluent containing a heavy metal, the installation comprising a heavy metal electroplating reactor of the type described above with reference to U.S. Pat. No. 4,226,685, in which reactor the removable volume cathodes can be regenerated easily.

SUMMARY OF THE INVENTION

According to the present invention, the solution to the technical problem posed lies in the metal constituting said current-feed grid being selected from metals having an oxidation-reduction potential that is greater than that of said heavy metal to be electroplated, said installation further including an electrochemical regeneration reactor for receiving said cathodes as anodes.

It is then possible to envisage performing a method of treating aqueous effluent containing a heavy metal, the method consisting:

in subjecting said aqueous effluent to electrolysis in an electroplating reactor of an electrochemical installation of the invention;

in withdrawing the volume cathodes from said tank when the active granular material is saturated with the heavy metal;

in placing said cathodes in a regeneration electrochemical reactor and in subjecting them to an anode potential so as to redissolve said heavy metal and regenerate said active granular material, the redissolved heavy metal being recovered on electrodes acting as cathodes; and after regeneration, in replacing said volume cathodes in said electroplating reactor.

Thus, by adjusting said anode potential to a value lying between the oxidation-reduction potential of the heavy metal and that of the current-feed metal, it is possible to cause only the heavy metal deposited on the active granular material to migrate towards the cathode of said second reactor during the regeneration operation, while not causing the metal that constitutes the current-feed grid to migrate.

The advantages of the electrochemical installation and of the treatment method of the invention are numerous.

Because the volume cathodes can be regenerated, the running cost of the treatment installation is limited merely to its consumption of electricity.

The performance of the cathodes does not fall off with the number of regeneration cycles performed. Merely topping up the granular bed, using less than 10% by weight of the initial mass of material, suffices to make the electrodes fully operational. Particularly in large installations, there is no longer any need for large amounts of storage room to be provided for active granular material such as oil coke for feeding to the treatment reactors.

When a cathode of an installation of the invention becomes clogged, there is no longer any need to remove the electrode in order to change the granular bad filled with heavy metal. This technique makes it possible to achieve substantial savings in the time required for taking action on the electrochemical treatment installation.

The cathodes can be subjected to electroplating and to regeneration in the same location, thereby reducing transfers of electrodes filled with heavy metal and the time required by the personnel running the treatment installation for taking action on it.

Since regeneration takes place more quickly than recovering the heavy metal by electroplating, two sets of cathodes suffice. While one set is being used for electroplating, the other is being regenerated. Using this method, it is possible to run an electrochemical depollution installation economically, continuously, and efficiently.

Since the electrodes can be regenerated quickly, one of the main drawbacks of fixed bed volume cathodes no longer arises. When performing electrolysis in a concentrated solution, a fixed bed cathode clogs quickly and as a result becomes unusable. If electrode regeneration is not possible, then it is unadvisable to use a fixed bed cathode for purifying a concentrated solution (having more than 1 g/l of metal) since the process becomes clogged quickly. With the invention, since the electrode can be regenerated in a short period of time and close to the first reactor used for treatment, thereby minimizing the cost of the method, it is possible to envisage electroplating a metal from a concentrated solution of the metal ion. The advantage is that under such circumstances there is no longer any need to use two types of reactor, one for working on the solution when concentrated and another for working on the dilute solution.

Since the electrodes can be regenerated, there is no longer any need to maintain a stock of new cathodes for feeding to the electrochemical treatment installation of the invention.

BRIEF DESCRIPTION OF THE DRAWINGS

The following description given by way of non-limiting example and made with reference to the accompanying drawings makes it easy to understand what the invention consists in and how it can be implemented.

FIG. 1 is a plan view of an electrochemical reactor from an electrochemical installation of the invention.

FIG. 2 is a section on AA through the reactor of FIG. 1 without its electrodes.

FIG. 3 is a section on BB through the reactor of FIG. 1.

FIG. 4 is a fragmentary perspective view of the inside face of one of the vertical walls of the reactor.

DETAILED DESCRIPTION

Figure 5:
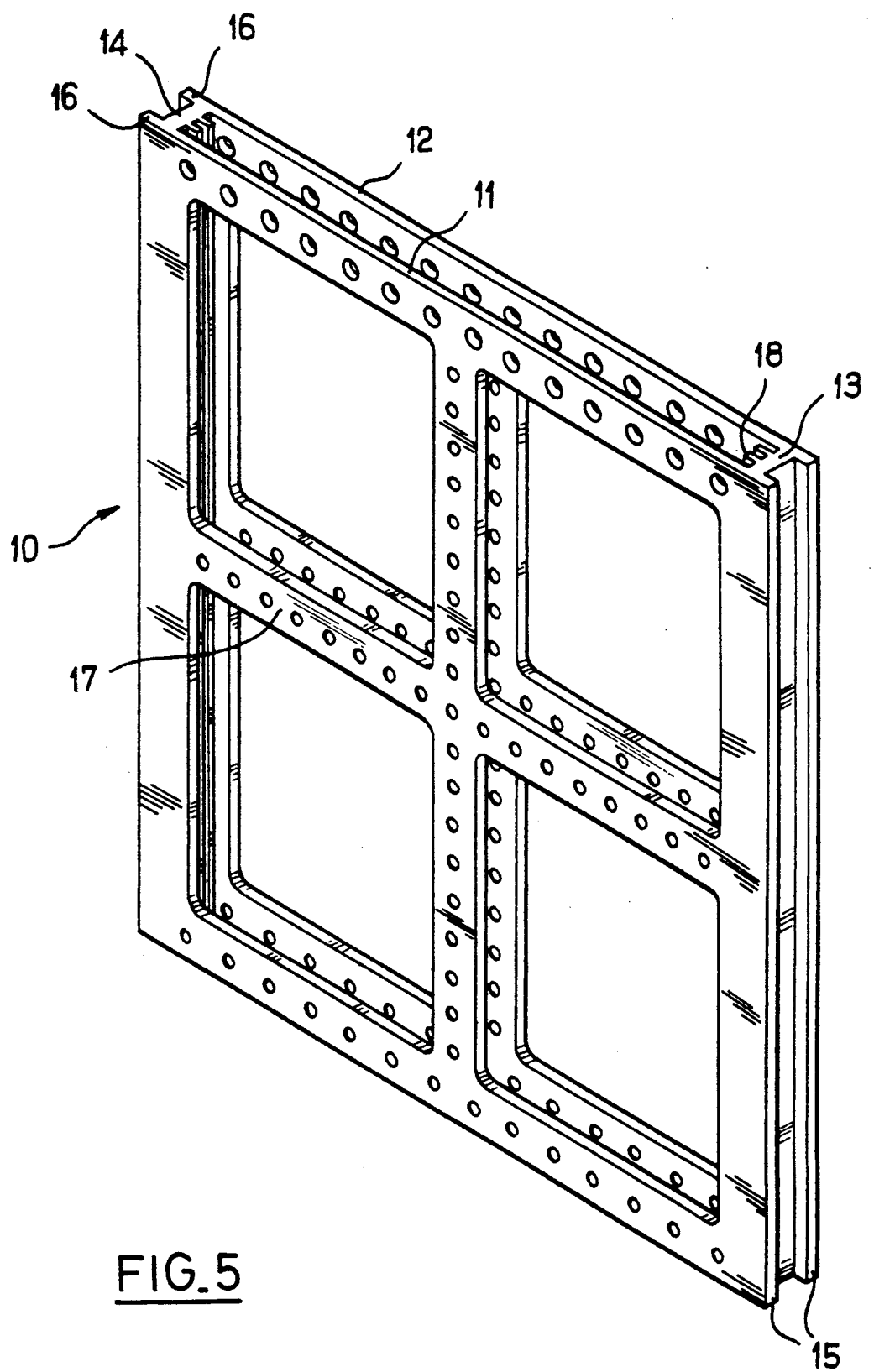
FIG. 5 is a perspective view of a frame for an electrode of the FIG. 1 reactor.

An electroplating reactor in an installation for treating aqueous effluent containing a heavy metal and as shown in FIGS. 1 to 6 comprises a tank 1 in the form of a rectangular parallelepiped fitted with a system 2 at one of its ends for feeding it with liquid. At its other end it has an outlet manifold 3 and a safety overflow 4. The feed system may be a removable hydraulic manifold as shown in FIG. 3. The feed flow rate is adjusted by means of a valve (not shown). Effluent is removed from the bottom portion of the reactor. The overflow serves to remove effluent in the event of the outlet manifold 3 becoming clogged. The two opposite vertical walls 5 and 6 are provided in their middle portions with respective series of vertical grooves 7 constituting means for enabling the electrodes to be installed removably. This portion of a wall is shown more clearly in FIG. 2.

Removable volume cathodes 9 and anodes 8 are installed in alternation in the tank.

FIG. 5 shows a cassette 10 of a removable electrode of the invention that is suitable for being dismantled. Such a cassette is constituted by two parallel frames 11 and 12 interconnected along their vertical edges by vertical partitions 13 and 14. The partitions are set back from the vertical edges of the frames 11 and 12 so as to leave tongues 15 and 16 on the outside faces of the partitions 13 and 14.

When the electrode is being installed in the tank, the tongues 15 and 16 slide in the grooves 7 in the walls of the tank. The dimensions and the positions of the grooves 7 in the tank are naturally provided so as to be complementary to the tongues 15 and 16.

In the cassette shown in FIG. 5, each of the frames 11 and 12 is provided with a cross-piece 17. Such a cross-piece is particularly useful with electrodes of large size since it imparts a degree of stiffness thereto. The cross-piece preferably has regular openings so as to provide a maximum area for electrolysis to the hydraulic flow. It may be omitted from electrodes of small size.

The facing inside faces of the partitions 13 and 14 are each provided with three grooves 18. These grooves 18 enable the following to be installed in succession between the frames 11 and 12 of a cassette 10: a first wall which is permeable to the aqueous effluent; a metal grid for feeding current; and then a second permeable wall identical to the first permeable wall.

Figure 6:
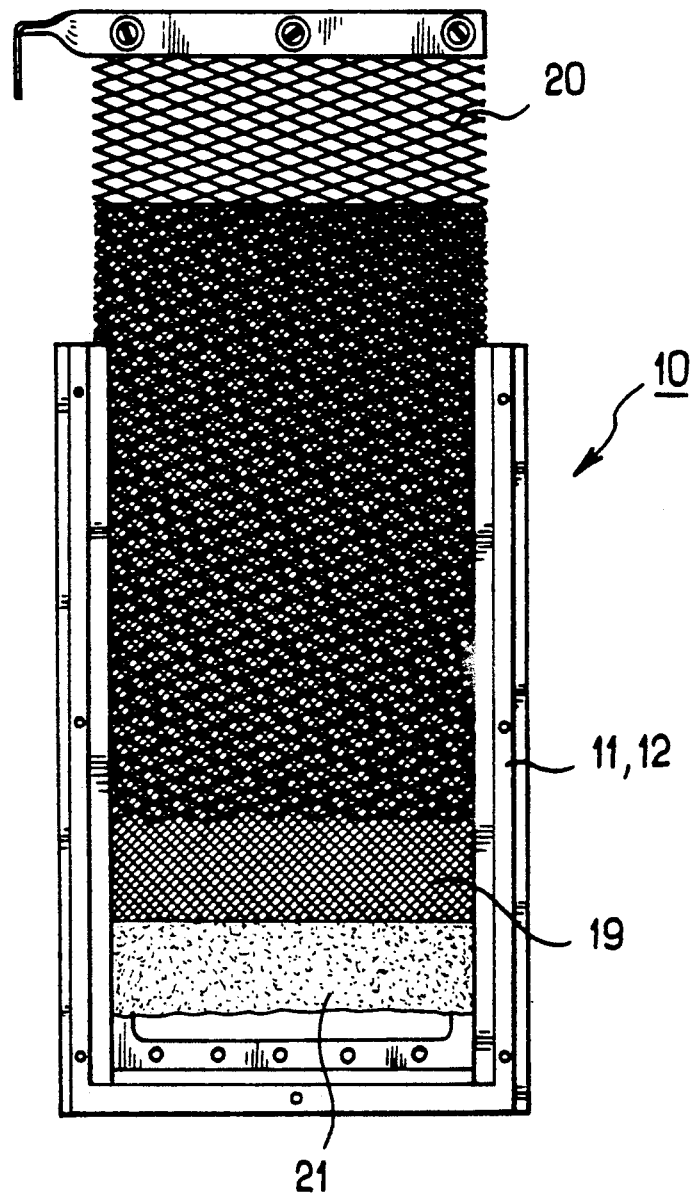
FIG. 6 is an exploded view of an electrode of the FIG. 1 reactor.

FIG. 6 shows a complete volume electrode that is capable of being disassembled. It comprises a cassette 10 having open frames 11 and 12 between which the following are installed in succession: a first permeable wall constituted by an assembly comprising an engineering textile 21 and a PVC grid 19; a current-feed grid constituted by an expanded metal 20; and a second engineering textile and PVC grid assembly (not shown).

The cassette constituting the electrode supports stand on spacers 22 to avoid a phenomenon of cascade flow inside the reactor.

The engineering textile used is selected from porous materials that are capable of chemically withstanding the electrolysis conditions that take place in the electroplating reactor, e.g. Bidim (registered trademark) when electrolytically recovering copper in galvanoplasty baths.

The permeable walls of a single cathode define a space which, in addition to its current-feed grid, is filled with an active granular material. It is possible to use particles of carbon, of a conductive organic polymer, or granules of the same metal as the metal to be plated. Nevertheless, it is preferable to choose petroleum coke which has the advantage of providing a large contact area and good electrical conductivity in a granular bed at low cost. In addition, petroleum coke can be used both as an anode and as a cathode, which is particularly favorable for use in an electrochemical treatment installation of the invention.

In order to regenerate volume cathodes after the active granular material has been saturated with the heavy metal, the treatment installation includes a regeneration reactor for receiving said volume cathodes as anodes, and the metal constituting said metal current-feed grid 20 is selected from those metals, e.g. titanium, that have an oxidation-reduction potential which is higher than that of the heavy metal under consideration and which make it possible to detect the end of regeneration, as explained below.

Figure 7:
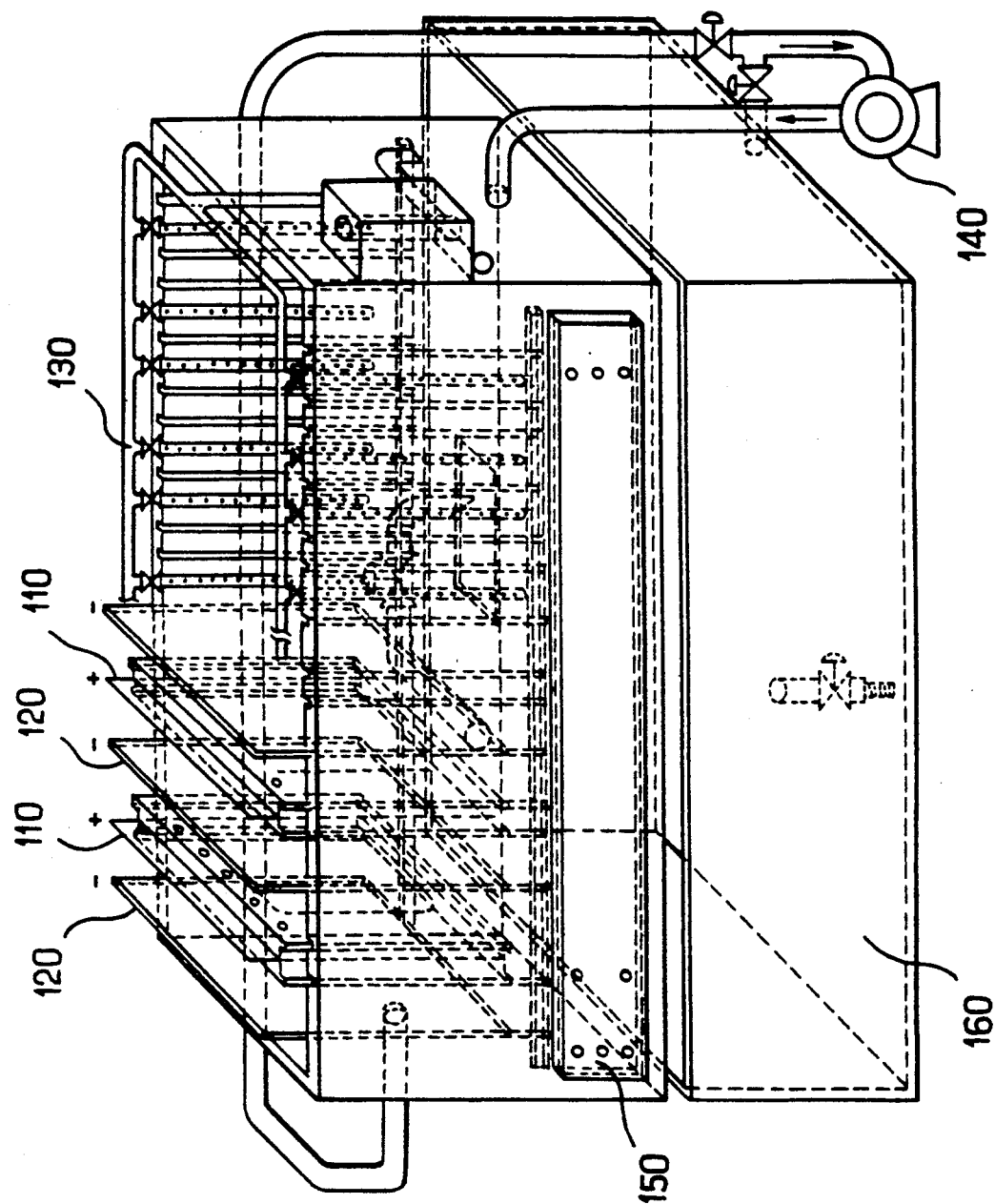
FIG. 7 is a perspective view of an electrochemical reactor for regenerating an electrochemical installation of the invention.

FIG. 7 is a perspective view of a regeneration electrochemical reactor which can be secured to the electroplating reactor in a treatment installation. The regeneration reactor comprises an alternating structure of electrodes 110 and 120 analogous to the reactor described with reference to FIGS. 1 to 4. The cathodes 110 to be regenerated taken from the electroplating reactor are placed as anodes, while cathodes 120 are placed facing them. The cathodes 120 of the regeneration reactor are preferably selected as comprising the same metal as the heavy metal that is extracted from the treated effluent, e.g. copper when said heavy metal is copper. The cathodes 120 of the regeneration reactor may be implemented in the form of solid plates since the metal is now present in the form of a concentrated solution in the electrolyte (the metal that is electroplated while treating several tens of cubic meters of effluent can be dissolved in an electrolyte having a volume of 100 liters). During treatment, the volume cathodes 110 are subjected to an anode potential that has the effect of electrolytically dissolving the metal present. The metal ions dissolved in this way move under the influence of the electric field to a cathode plate 120 where they are electroplated. If the anode potential has a value lying between the oxidation reduction potential of the heavy metal to be treated and the oxidation-reduction potential of the metal used for the current-feed grids in the volume cathodes, then said current-feed metal is not subjected to the electrolytic dissolution phenomenon and said current-feed grid is not spoiled. As the regeneration operation takes place, the active granular material of the volume electrode looses metal and becomes reusable in the first reactor for electroplating purposes. Simultaneously, the metal plate picks up pure metal and can thus easily be recycled. For example, more than 60 regeneration cycles have been performed on an electrode charged with copper taken from an electrolytic copper-plating bath.

As can be seen in FIG. 7, the tank of the regeneration reactor includes a bubbling system 130 between the electrodes for the purpose of making the solution homogeneous thus ensuring good transfer of material between the electrodes. A pump 140 placed at the bottom of the tank ensures that the solution is mixed and also serves to improve the transfer of material, and to perform temperature regulation of the solution. At the bottom of one of its side walls, this tank is provided with a trap door 150 enabling the metal electrolysis sludge to be evacuated when the reactor is cleaned. During a cleaning operation, the electrolyte is transferred into a receptacle 160 situated beneath the tank. It is then possible to withdraw the cathodes 110 comprising the initial solid plates plus the metal deposit covering them (for a metal plate having an area equal to 288 $cm^2$, more than 2 kg of metal copper can be recovered). The metal present in the bottom of the tank is recovered via the trap door 150. Once cleaning has been performed, it suffices to change the solid cathodes 110 and to put the electrolyte back into the tank by means of the circulation pump 140. The regeneration reactor is then again ready for operation. There is no need to perform this cleaning operation frequently: as mentioned above once every 60 cycles suffices.

Figure 8:
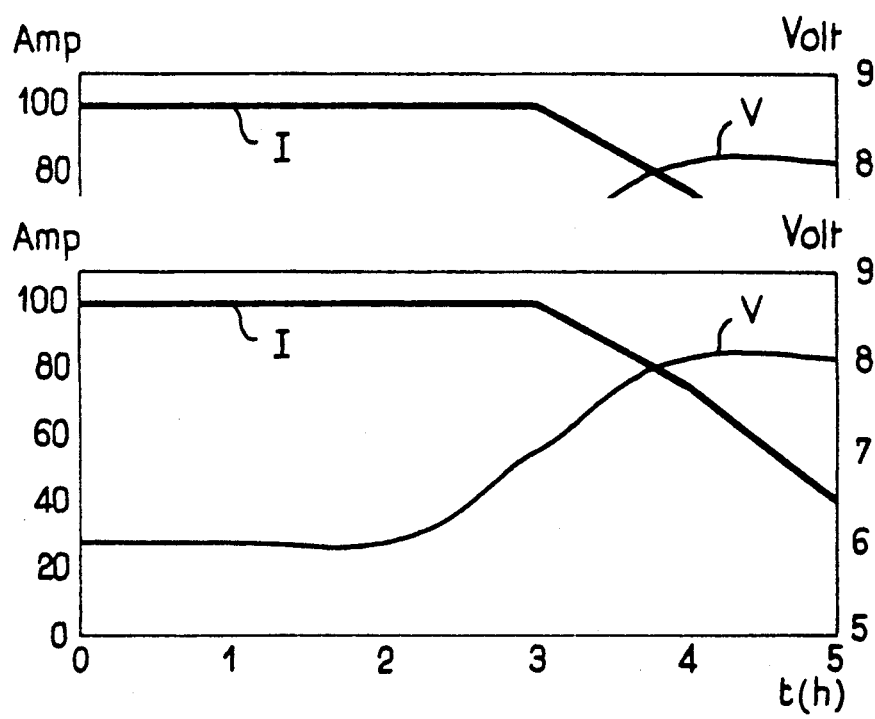
FIG. 8 is a graph showing variation in the voltage V, in volts, and the current I, in amps, as a function of time t, in hours, during the regeneration operation and when using titanium for the current feed in the volume electrodes.

The advantage of using titanium as the current-feed metal in the volume electrodes is that it enables the electrode to perform numerous cycles, and because of its special properties, it also makes it possible to detect the end of regeneration (cf. FIG. 8).

When the electrode is subjected to a cathode potential (electroplating the metal present in the form of electroactive ions in the effluent), the titanium current-feed serves solely to ensure that potential and current are uniformly distributed within the granular bed. During the regeneration step, the metal collected during the purification operation is oxidized into its cation under the effect of the imposed anode potential. This ion is then electroplated on a solid plate for the purpose of being recycled in the method (e.g. as a soluble anode) or for being resold as pure metal. When the regeneration operation has terminated, there remains hardly any metal in the volume electrode, and it is at this point that the current-feed begins to oxidize. The characteristic of the titanium used is its tendency under anode potential to form its non-conductive oxide $TiO_2$. This phenomenon can be used to indicate the end of the regeneration step. Stabilized electrical power supplies make it possible to regulate current or voltage. If current is set, then voltage can vary freely within technological limits imposed by the apparatus. When the voltage reaches the maximum value allowed by the power supply, then it is current that varies. Current will then fall off as the resistance across the terminals of the electrolyzer increases. In order to understand this phenomenon more clearly, an example is described where five volume cathodes are regenerated by means of a stabilized 100 A/8 V power supply. The starting current is set to a value of 100 A. Since the solution is conductive, the voltage across the terminals of the electrolyzer is about 6 V. While the electrode is being regenerated, the voltage remains close to 6 V and as a result the set current remains at its reference value of 100 A. When the major portion of the metal recovered during purification of the effluent has passed into the regeneration electrolyte, the passivation reaction of the titanium current-feed begins, immediately increasing the voltage across the terminals of the electrolyzer. Once this voltage reaches the value of 8 V, voltage regulation automatically takes over. As resistance increases, and given that the maximum allowable voltage across the terminals of the electrolyzer cannot exceed 8 V, current begins to fall as shown in FIG. 8. When current begins to fall, the electrodes are removed from the regeneration reactor and are reinserted into the electrolysis reactor. Laboratory tests have shown that it is possible to perform 100 regeneration cycles on a volume electrode without suffering significant degradation in its performance. The ability to recycle an electrode in this way provides an important advantage since handling (electrode reconditioning) is avoided. There is therefore no need to store consumables for keeping the electrolysis method in condition (unlike most prior art systems), and the ability to regenerate the electrode outside the purification reactor provides the advantage of not stopping the purification process, unlike known solutions that make use of an in situ regeneration technique which, although apparently attractive, suffers from reducing purification efficiency. In the proposed method, cycling makes it possible to use one cathode for heavy metal recovery while another one is being regenerated. When the recovery, cathode is fully charged, the purification installation is put back into condition merely by swapping that electrode with the electrode that was being regenerated. This requires only a few minutes of handling. During such a short period of time there is no significant loss in the effectiveness of the electrolytic treatment since the electrolyzer has a plurality of cathodes so there always remain $N-1$ electrodes in operation while a metal-charged cathode is being changed. Industrially, the drop in current may be used to trigger an end-of-end regeneration signal (audible or visible warning, control pulse to a controller, ...) so as to automate operation of the installation for depolluting electrolyte.

We claim:

1. An electrochemical installation for treating aqueous effluent containing a heavy metal, the installation comprising an electroplating reactor including a tank in which alternating electrodes of opposite polarity are placed as anodes and cathodes, the cathodes being removable volume electrodes each constituted by a cassette in the form of two facing frames each supporting a wall that is permeable to said aqueous effluent, the permeable walls of a single cathode defining a space that is filled with an active granular material and in which a metal current-feed grid is disposed, wherein the installation further comprises a regeneration electrochemical reactor receiving said cathodes for operation as anodes, the metal constituting said metal current-feed grids having a passivated condition which is assumed at the end of regeneration.

2. An electrochemical installation according to claim 1, wherein said metal constituting the metal current-feed grids is selected from metals having an oxidation-reduction potential greater than that of the heavy metal to be electroplated.

3. An electrochemical installation according to claim 2, wherein said metal constituting the metal current-feed grids is titanium.

4. An electrochemical installation according to claim 2, wherein said active granular material is petroleum coke.

5. A method of treating an aqueous effluent containing a heavy metal, the method comprising:
    subjecting said aqueous effluent to electrolysis in an electroplating reactor of an electrochemical installation, the reactor including a tank containing alternating electrodes of opposite polarity which serve as cathodes and anodes, the cathodes being removable volume electrodes with walls permeable to the aqueous effluent and defining a space containing an active granular material and a metal current-feed grid having passivating properties;
    withdrawing the cathodes from said tank when the active granular material is saturated with the heavy metal;
    placing the saturated cathodes in a regeneration electrochemical reactor and subjecting them to an anode potential so as to redissolve said heavy metal and regenerate said active granular material, the redissolved heavy metal being recovered on solid plates acting as cathodes;
    detecting passivation of the metal current-feed grid as an indication of the end of regeneration; and
    after regeneration, replacing said volume cathodes in said electroplating reactor.

6. A method according to claim 5, wherein the current-feed grid is made of titanium and the passivation is detected by detecting the instant at which current through the grid begins to drop.

7. A method according to claim 6 further including the step of triggering an alarm signal after detecting the end of regeneration.

* * * * *